United States Patent [19]
McCall et al.

[11] Patent Number: 5,525,960
[45] Date of Patent: Jun. 11, 1996

[54] REMOTE TIRE AND SHOCK ABSORBER MONITOR

[76] Inventors: Richard E. McCall, 322 S. Britain Rd., Irving, Tex. 75060; Craig A. Coad, 165 Chaparral Estates, Denton, Tex. 76208; Larry L. Uland, #1 W. Crawford Rd., Argyle, Tex. 76226

[21] Appl. No.: 117,799

[22] Filed: Sep. 8, 1993

[51] Int. Cl.[6] ........................................... B60Q 1/00
[52] U.S. Cl. ................... 340/438; 340/443; 73/146.5; 116/34 R; 200/61.23; 200/61.24; 200/61.25; 200/61.26
[58] Field of Search ...................... 340/438, 443; 73/146.5; 200/61.23, 61.24, 61.25, 61.26; 116/34 R

[56] References Cited

U.S. PATENT DOCUMENTS

| | | | |
|---|---|---|---|
| 4,554,528 | 11/1985 | Burkel et al. | 73/146.5 |
| 4,567,460 | 1/1986 | Gebler | 73/146.5 |
| 4,866,419 | 9/1989 | Kyrtsos et al. | 340/443 |

*Primary Examiner*—John K. Peng
*Assistant Examiner*—Daryl Pope
*Attorney, Agent, or Firm*—John E. Vandigriff

[57] ABSTRACT

A system for monitoring the steady state condition of a motor vehicle shock absorber is used to identify conditions in which a tire may be under- or over-inflated, or in which a shock absorber needs adjustment or replacing. A device for measuring distance, such as a measuring tape, is affixed along the length of a movable portion of a shock absorber, and is monitored by a shock absorber sensor, which is mounted in a fixed position relative to the measuring device. The vertical distance through which the movable portion of the shock absorber moves and the velocity of the oscillations of said movable portion is thereby monitored, and data is transmitted from the sensor to a circuit for transforming said data into a visual display for visual monitoring by the vehicle driver. Said data is further sent through a comparator circuit for comparing to other data received simultaneously from at least one other sensor similarly mounted in relation to another shock absorber of the vehicle. When the vertical distance or frequency oscillation data of a shock absorber sensor deviates beyond a predetermined threshold variance from the data of said other sensor, an alarm indicator is activated for encouraging the driver to check the air pressure and/or shock absorber of the particular tire(s) associated with the deviation.

5 Claims, 12 Drawing Sheets

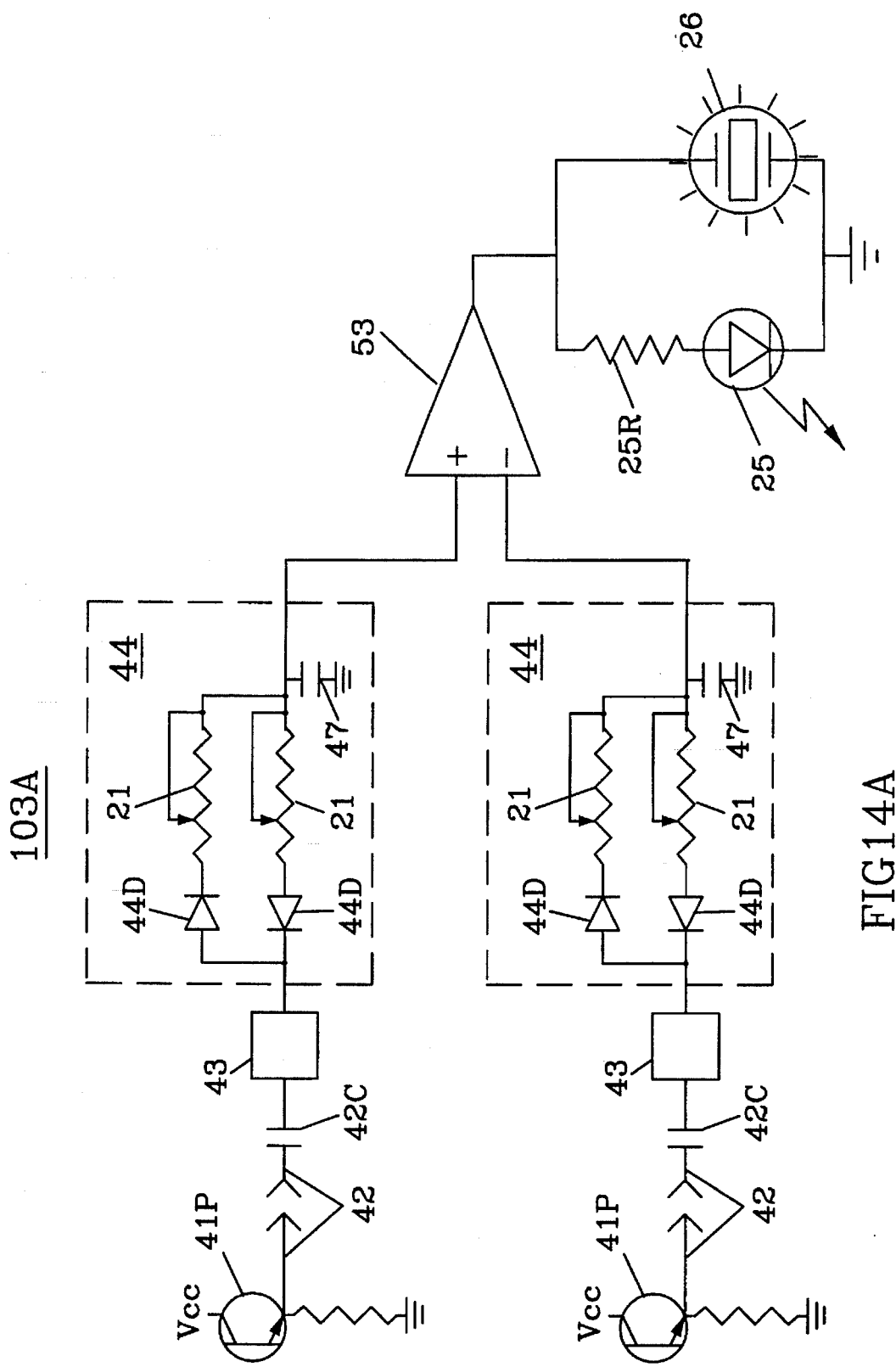

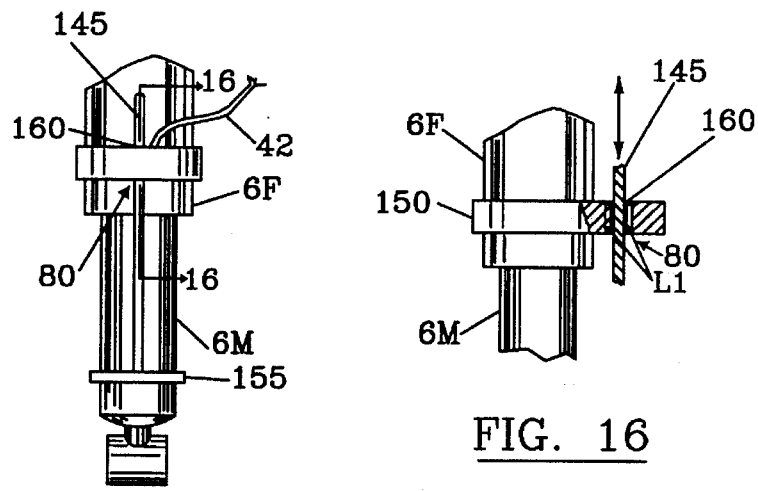
FIG. 15
FIG. 16
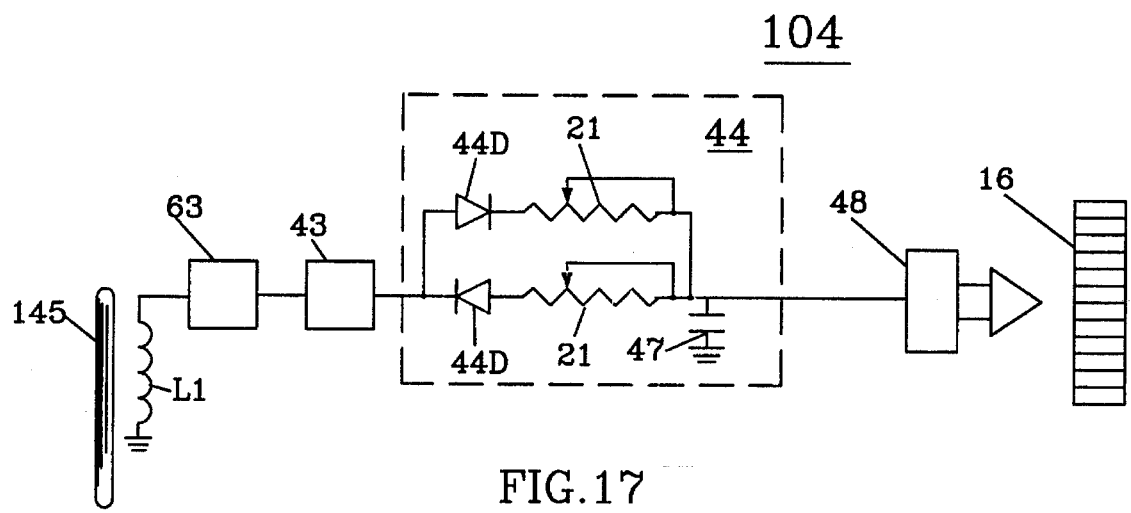
FIG. 17

REMOTE TIRE AND SHOCK ABSORBER MONITOR

BACKGROUND OF THE INVENTION

The invention relates to devices for detecting and warning a driver of an improper amount of air pressure in a pneumatic tire on the vehicle he is driving, and more particularly to devices for warning the vehicle driver when a condition exists which is indicative of either an improperly inflated tire or a shock absorber needing adjustment or replacing.

The added expense of an under inflated tire or a maladjusted shock absorber is well known. Under inflated tires reduce fuel economy by providing unnecessary rolling resistance, and also exhibit shorter useful lives due to excessive flexing of the tire side walls. Maladjusted shock absorbers not only tend to further decrease the useful life of the tires with which they are connected, but they also tend to shorten the useful life of the entire vehicle suspension system, by failing to dampen the amount of stress experienced by other components of this system. Although these costs are well known, the typical motorist does not often take the additional time required to manually measure the pressures of his various tires. Likewise, the typical motorist does not have ready access to the conventional tools or methods used to detect early failure of a shock absorber.

Many attempts to overcome these problems have been made. Several of these consist of placing a visual tire pressure indicator on the valve stem of a tire. Unfortunately, these require the driver to visually inspect each tire, which is a task that cannot be done while the vehicle is traveling. To overcome this problem, others have incorporated a remote signaling device for use in conjunction with other types of stem-located indicators for signaling information regarding a tire's pressure to the driver. However, these tend to produce a signal which is subject to false alarms introduced by bounce or the centrifugal force of the tire, and tend to unbalance the tire to which they are attached.

Several additional remote systems for warning the driver of an under inflated tire while he is driving have been attempted. These have included the incorporation of tire pressure monitors located inside the tires being monitored, which are associated with communication devices for transmitting a warning to the driver when the pressure in one of the tires falls below a predetermined value. An example of these devices is disclosed in U.S. Pat. No. 4,240,061 (Cohen), in which a sensing device and transmitter are located inside each pneumatic tire for rotating with the tire. The same signal reliability problems due to system stresses caused by centrifugal force and bounce noted earlier limit these type systems.

In U.S. Pat. No. 4,978,941 (Brown) is disclosed a remote system in which the suspension system and centrifugal stresses noted above are reduced, via locating the pressure sensor and transmitter devices in close relation to the center of each tire. Although the problem stresses are addressed in this teaching, the expense of the special tire mounts disclosed therein would be prohibitive for the typical motorist.

Another type system disclosed in the prior art is that of monitoring distances between fixed portions of the vehicle and the road surface, in relation to a predetermined value, such as the distance between said fixed portions when the tire adjacent said fixed portions was last inflated. Clothier, in his U.S. Pat. No. 4,075,602, describes in one of these type systems firmly flexible wires fixedly mounted adjacent each tire. Each wire is fixed so that it will not touch the road surface, unless the pressure of the tire with which it is associated falls below a predetermined amount, as indicated by said tire going "flat", and thereby allowing said wire to touch the road. The wires are electrically connected to a monitoring system for precipitating a warning signal to the driver when one of said wires touches the road surface. Although these type systems appear relatively simple, they are prone to false alarms caused by the many variations in road surface, such as bumps and ruts, over which most vehicles tend to drive and tend to require more additional maintenance effort, such as readjusting said wires after each reinflation of the tires, than most motorists are willing to add to their schedule.

Another type device is taught by Jones in U.S. Pat. No. 4,574,267, in which is disclosed the use of an accelerometer in conjunction with a remote signaling device and computer for measuring the changes in acceleration of a tire. The system monitors the acceleration rate and calculates a corresponding resonant frequency curve for each tire. This data is then compared to previous data and to similar data of another tire of the vehicle to detect an indication that one of the tires is under inflated. Although Jones' disclosure addresses many of the problems associated with prior systems, his disclosure is limited to the calculation and analysis of resonant frequencies associated with tire acceleration, which limits said system to the use of at least one microprocessor which tends to make the system too expensive for use by the average motorist.

While the above mentioned devices may be suitable for the particular purpose to which they address, they would not be as suitable for the purposes of the present invention. As well as having the problems of limited reliability and expense, none of the noted devices discloses a system for warning the driver of a condition in which a tire is improperly inflated or in which a shock absorber needs adjusting or replacing via monitoring the vertical distance through which the movable portion of a shock absorber travels, or the oscillation frequency said movable portion travels through said distance, during vehicular movement.

In view of the foregoing disadvantages inherent in the known types of tire pressure indicators now present in the prior art, the present invention provides an improved apparatus for warning a vehicle driver of a condition in which a vehicle tire is improperly inflated, or in which a shock absorber needs adjusting or replacing. As such, the general purpose of the present invention, which is described in greater detail below, is to provide a new and improved tire pressure- and shock absorber- monitor which has all the advantages of the prior art and none of the disadvantages.

SUMMARY OF THE INVENTION

The present invention provides a system for monitoring tire inflation pressure and shock absorber effectiveness by detecting significant variances in the vertical oscillation frequency of a tire, or in the vertical displacement of the movable portion of a shock absorber, which may be indicative of a tire needing reinflation or a shock absorber needing adjusting or replacement. Said variances are checked against either a predetermined ("zero state") threshold or against similar measurements being taken from at least one other tire. Sensors are mounted on each shock absorber for monitoring the vertical movement of the movable portion of the shock absorber relative to the fixed portion. Each sensor is electrically connected to means for warning the driver when the measurement being taken (vertical oscillation frequency or, vertical displacement) exceeds the predetermined threshold.

As has been noted in the art, e.g., SAE Paper No. 680,408, the inflation pressure of a tire affects the spring rate (oscillation frequency) of said tire. As inflation pressure diminishes, the tire spring rate will also decrease. Those skilled in the art will also recognize that said spring rate, as well as the vertical displacement of said tire, is also affected by the decreased efficiency of the shock absorber associated with said tire. The present invention makes use of this knowledge and simple, non-computer based, electronics to identify when said oscillation frequency or displacement exceeds a threshold which is indicative of either the tire needing reinflation, or the shock absorber needing adjustment or replacing.

Representative embodiments of the concepts of the present invention are illustrated in the appended drawings and described herein. The objective of the drawings and the corresponding description is to illustrate various embodiments of the present invention, all of which make use of means for monitoring the vertical displacement of a movable portion of a shock absorber or means for monitoring the vertical oscillation frequencies of said movable portion, and means for warning the vehicle driver when either the vertical displacement or the vertical oscillation frequency deviates from a predetermined threshold variance, and one or more of the following: a visual display indicative of said vertical displacement; a visual display indicative of said oscillation frequencies; means for comparing the vertical displacement of at least two shock absorbers; and means for comparing the oscillation frequencies of at least two shock absorbers.

There has thus been outlined, rather broadly, the more important features of the invention in order that the following detailed description thereof may be better understood, and in order that the present contribution to the art may be better appreciated. There are of course additional features of the invention that are described hereinafter and which form the subject matter of the claims appended hereto. In this respect, it should be understood that the embodiments herein described are for illustrative purposes, only, and are not intended to be limiting in the application, the details of construction or to the arrangements of the components of the present invention. It will be obvious to those skilled in the art that the invention is capable of other embodiments and of being practiced and carried out in various ways. It is important, therefore, that the claims be regarded as including such equivalent embodiments insofar as said embodiments do not depart from the spirit and scope of the present invention.

It is therefore an object of the present invention to provide a new and improved remote tire and shock absorber monitor for detecting a condition in which a shock absorber needs adjusting or replacing, and for warning a vehicle driver of said condition.

It is a further object of the present invention to provide a new and improved remote tire and shock absorber monitor for warning a driver when a condition exists in which a tire is improperly inflated.

It is a further object of the present invention to provide a new and improved remote tire and shock absorber monitor which has all the advantages of the prior art remote tire pressure monitors and none of the disadvantages.

It is another object of the present invention to provide a new and improved remote tire and shock absorber monitor which has a sensor that is remote from the tire, and therefore not capable of precipitating an unbalanced tire, or of being subjected, to all of the same impact stresses with which the tire is dealing.

It is another object of the present invention to provide a new and improved remote tire and shock absorber monitor which may be easily and efficiently manufactured and marketed.

It is a further object of the present invention to provide a new and improved remote tire and shock absorber monitor which is of durable and reliable construction.

An even further object of the present invention is to provide a new and improved remote tire and shock absorber monitor which is susceptible of a low cost of manufacture with regard to both materials and labor, and which accordingly is then susceptible of low prices of sale to the consuming public, thereby making such monitors economically available to the buying public.

It is another object of the present invention to provide a new and improved remote tire and shock absorber monitor which has means for rejecting false alarms due to unusual road surface conditions.

These together with other objects of the invention, along with the various features of novelty which characterize the invention, are pointed out with particularity in the claims appended hereto and form a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

FIG. 14A is a block diagram and partial electronic schematic of another embodiment of the circuitry associated with the tire and shock absorber monitoring system of the present invention.

FIG. 15 is a front plan view of still another embodiment of the remote tire and shock absorber monitor of the present invention.

FIG. 16 is a partial section view of the embodiment of FIG. 15 along 16—16.

FIG. 17 is a block diagram and partial electronic schematic of still another embodiment of the circuitry associated with the embodiment of FIG. 16.

DESCRIPTION OF VARIOUS EMBODIMENTS

Figure 1:
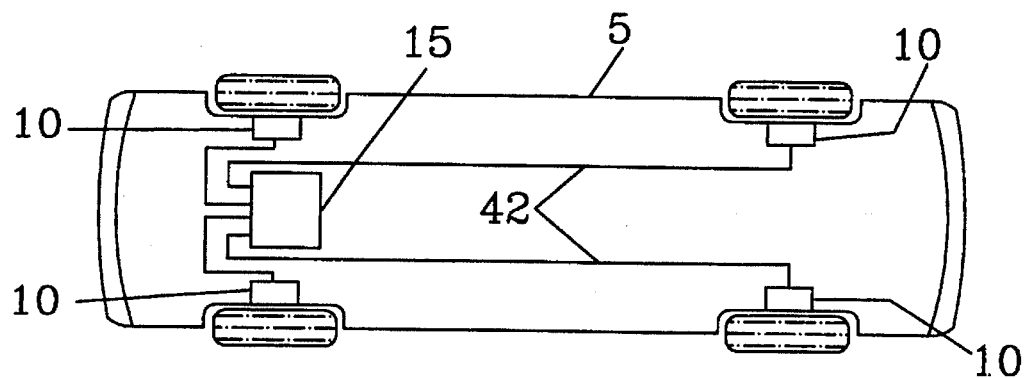
FIG. 1 is a block diagram representation showing the general layout of the components of an embodiment of the remote tire and shock absorber monitor of the present invention.
Figure 2:
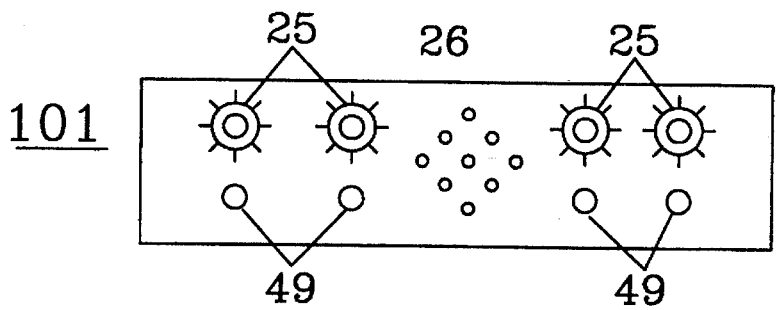
FIG. 2 is a front plan view of an embodiment of a visual display of the present invention.
Figure 3:
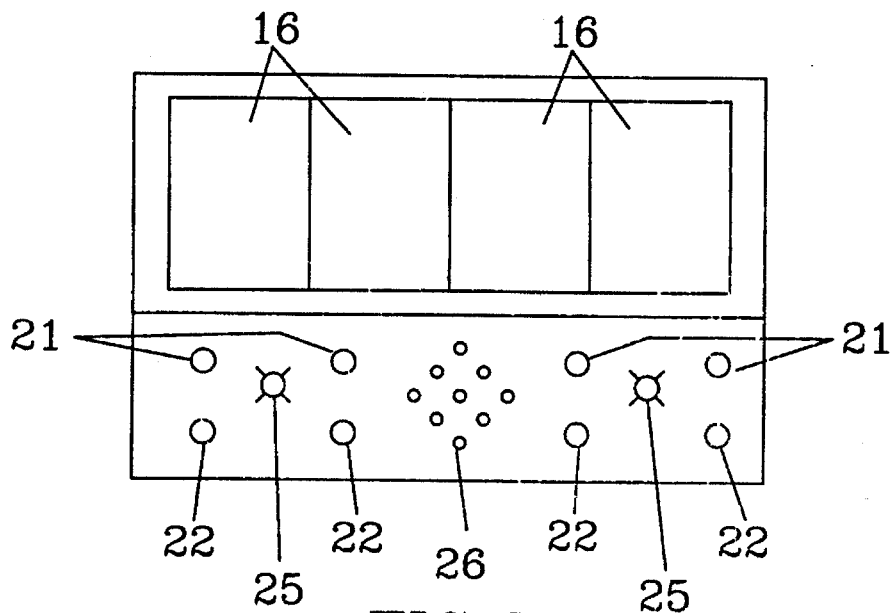
FIG. 3 is a front plan view of another embodiment of a visual display of the present invention.

The present invention comprises a remote tire and shock absorber monitor and system for warning a vehicle driver of a condition in which a vehicle tire is improperly inflated, or in which a vehicle shock absorber needs adjusting or replacing. FIG 1 of the appended drawings illustrates a block diagram of an embodiment of a tire and shock absorber monitoring system 100 of the present invention having monitors 10 as means for monitoring the vehicle tires and shock absorbers (not shown) and alarm indicator unit 15 as means for warning the vehicle driver of a condition in which a tire needs reinflating or a shock absorber needs adjusting or replacing, said alarm indicator unit 15 being electrically connected and responsive to the monitors 10. FIGS. 2 and 3 illustrate various embodiments of the front face of the alarm indicator unit 15, which may be mounted in part of the vehicle dash board for ready viewing by the vehicle driver. Alarm indicator unit 15A includes four visual alarm indicators 25 (one for each tire), an audible alarm indicator 26 (said audible alarm indicator actually being a speaker or buzzer affixed to the back of the front face of the unit 15A) and four rotatable comparator control knobs 49R for adjusting the threshold variance of each alarm against which measurements being taken by monitors 10 are compared. Alarm unit 15B likewise includes visual alarm indicators 25 and the audible alarm indicator 26. However, instead of having one control knob 49R for each tire, the unit 15B has two slidable comparator control knobs 49S, or one for each pair of tires, for adjusting the threshold variance between each tire of a pair of tires. As well, the unit 15B includes a plurality of LED displays 16 for use in visually comparing the monitored movement of each tire with that of the other tires. Included in each of the visual displays 16 is a linear array of LED's arranged such that the number of LED's lighted in a particular array is indicative of the vertical displacement of the corresponding shock absorber, and the rate at which said number of lighted LED's in each of said arrays changes is indicative of the vertical oscillation frequency of the corresponding shock absorber. Further provided are a plurality of variable response control knobs 21C and variable decay control knobs 22C for adjusting the visual display 16 associated with each tire.

Figures 4, 5:
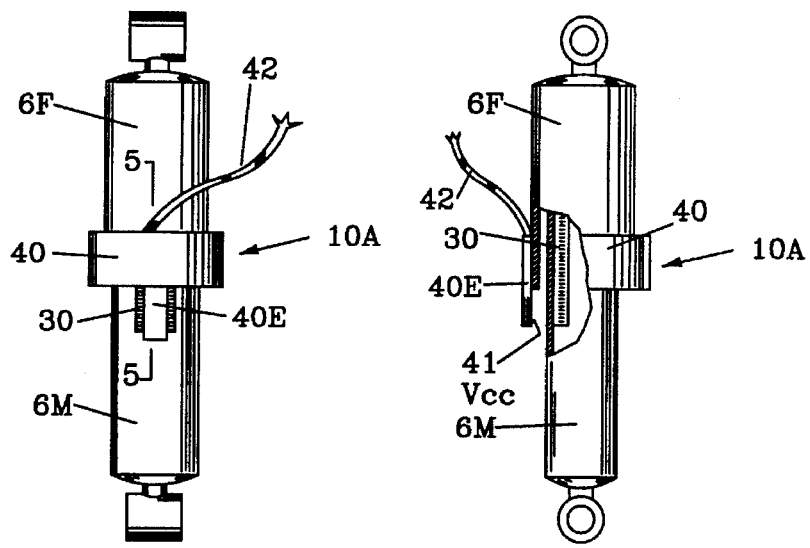
FIG. 4 is a front plan view of an embodiment of a remote tire and shock absorber monitor of the present invention.
FIG. 5 is a side plan and partial cutout view of the embodiment of FIG. 4.

FIGS. 4 and 5 illustrate an embodiment 10A of the monitor 10 of the present invention. FIG. 4 is a front plan view of said monitor 10A, while FIG. 5 is a side plan view including a partial cutout view of the same embodiment. Included in this embodiment is a sensor mount 40 for affixing a sensor 41 to the fixed portion 6F of a vehicle shock absorber. Said sensor mount 40 has an aperture 40A therethrough for being affixed as a band about the circumference of the fixed portion 6F. Said sensor 41 is affixed within a sensor mount extension 40E for accessing a view of a part of the movable portion 6M of the shock absorber. Conductor or wire 42 electrically connects the monitor 10A to the alarm indicator unit 15. Further included in this embodiment is a plurality of substantially uniform indicia affixed to said movable portion in a linear array 30 substantially coaxial with said movable portion and in a position such that said array can be readily monitored by the sensor 41 as said array undergoes the normal vertical oscillatory displacement of said movable portion 6M. Said linear array 30 further comprises a pattern of alternating dark and light colored shapes for creating in the light reflecting from a fixed portion of the surface of said linear array 30, relative to the sensor 41 and the fixed portion 6F of the shock absorber, a pattern of light pulses having a pulse frequency corresponding to the oscillation frequency of said movable portion 6M. In this particular embodiment, the sensor 41 is a photo-cell circuit having appropriate components for "viewing" said pattern of light pulses and transforming said pulses into an electric signal for use by the alarm indicator unit 15.

Figure 6:
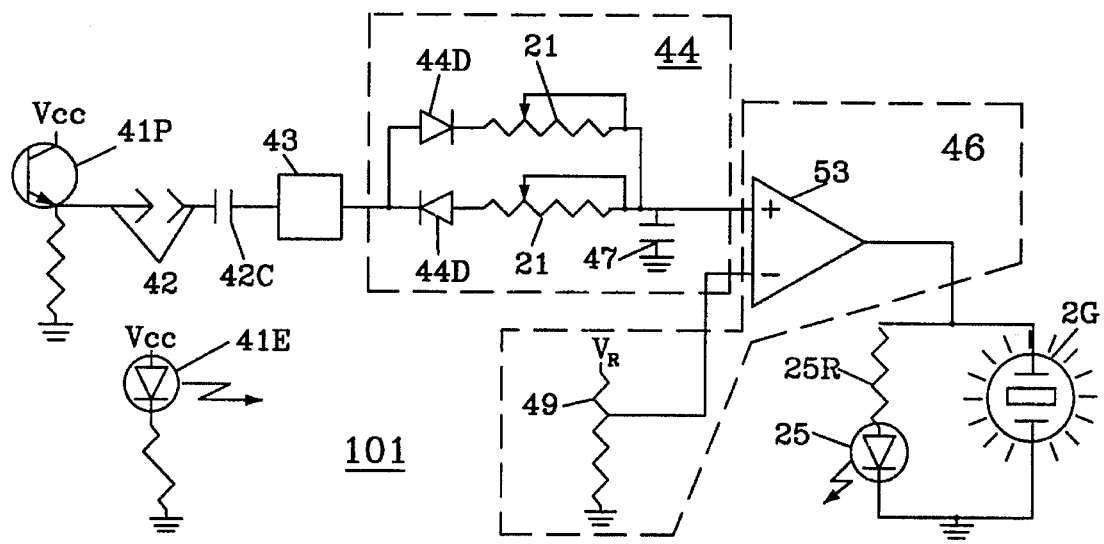
FIG. 6 is a block diagram and partial electronic schematic of the circuitry associated with an embodiment of the remote tire and shock absorber monitor of the present invention.

FIG. 6 illustrates an embodiment of the circuitry associated with the monitor 10A. Said embodiment comprises a system 101 which includes a photo-cell circuit 41 having a photo-emitter 41E for shining light onto the linear array 30, a photo-sensor 41P for viewing the light reflected off a portion of the surface of the linear array 30, a conductor 42 for electrically connecting said photo-sensor to a suitable frequency-to-voltage (F/V) converter 43, such as an LM2907 or an LM2917, for changing said pattern of light pulses into a voltage form. A blocking capacitor 42C is further included on the conductor 42 between said photo-sensor and said F/V converter 43 for preventing the flow of dc current across the circuitry of system 101. Electrically attached to the F/V converter 43 is a peak detector circuit 44 for stabilizing and adjusting the current flow from the F/V converter. Included in the detector circuit 44 are diodes 44D for peak detection and decay, variable resistors 21 for adjusting the response and decay portions of the current flow across said peak detection circuit 44, and a low pass filter 47 for enhancing the decay portion of said current flow. A comparator circuit 46 is further provided for comparing the electrical output of the peak detection circuit 44 to a preselected threshold variance as established via a variable resistor 49, which may be connected to the variable resistor control knobs 49R or 49S of the alarm unit 15. If the electrical output of the peak detection circuit 44 exceeds said preselected threshold, the comparator switch is thrown for actuating at least one alarm indicator. System 101 further includes both a visual alarm indicator 25 and an audible alarm indicator 26 electrically attached to the comparator 53 in parallel. Said visual alarm indicator 25 may be a photo-diode and said audible alarm indicator 26 could be a piezoelectric buzzer, although various other suitable components may similarly be used. Those skilled in the art will recognize that various other alarm indicators may be utilized in conjunction with the tire and shock absorber monitor of the present invention, such as an integrated circuit driven speaker that for playing a pre-recorded message as the audible alarm. An example of what such a message could include follows: "One of your front tires is low."

Although this particular embodiment of the present invention is uniquely simple in light of the prior art, those skilled in the electronic arts will readily recognize ass even simpler electronic circuit may be provided similar to that of System 101, but without the peak detection circuit 44. Eliminating said detection circuit 44 would result in a less stable and less well defined current for use by the comparator 53, and thereby require a significantly greater amount of adjustment using the variable resistor 49 in order that such a circuit be effective. The preferred embodiment, however, includes the peak detection circuit 44.

Figure 7:
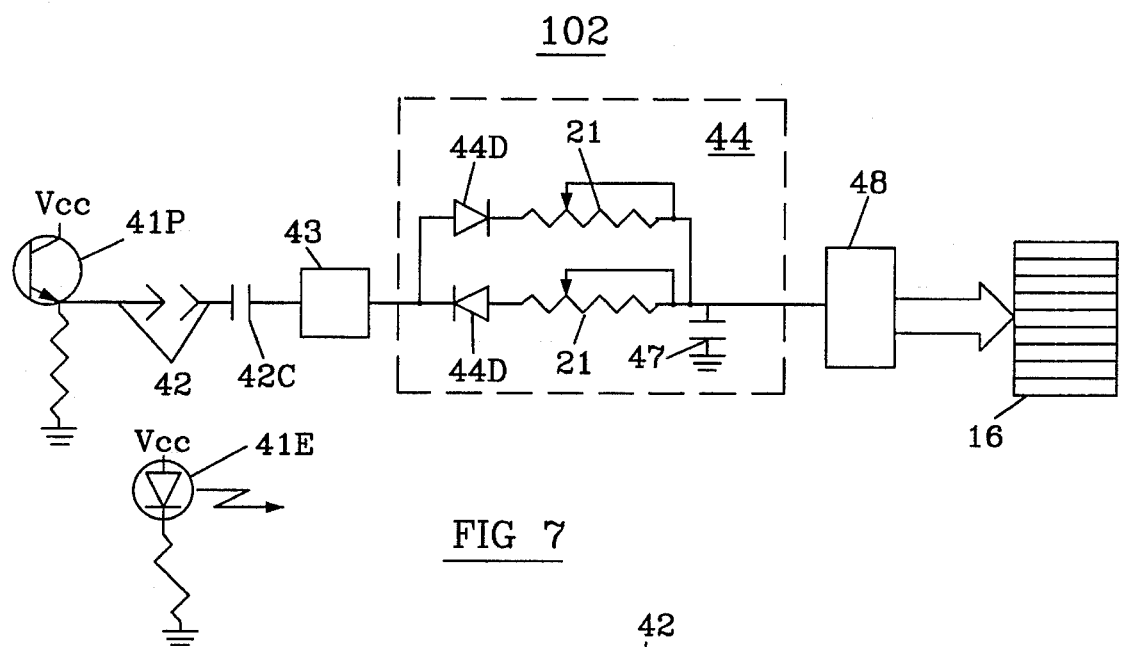
FIG. 7 is a block diagram and partial electronic schematic of the circuitry associated with another embodiment of the remote tire and shock absorber monitor of the present invention.

FIG. 7 illustrates ass other embodiment of the circuitry that can be used effectively with the monitor 10A. In this embodiment is a system 102, which includes a photo-cell circuit having a photoemitter 41E, a photo-sensor 41P, a conductor 42 for electrically connecting said photo-sensor to a frequency-to-voltage (F/V) converter 43, and a blocking capacitor 42C between said photo-sensor and said F/V converter 43 for preventing the flow of dc current across the circuitry of system 102. Electrically attached to the F/V converter 43 is a peak detector circuit 44. Although the shock absorber and tire pressure monitoring portion of the system 102 is substantially similar to that of the system 101, means for comparing the oscillation frequency of the associated shock absorber to a predetermined threshold variance is different. Instead of utilizing a comparator circuit 46 for conducting this comparison, the system 102 includes a visual display for allowing the vehicle driver to visually compare the oscillation frequencies associated with each tire. Included in the visual display of the system 102 is a suitable display driver circuit 48, such as an LM74914 or an LM3914, for transforming the electrical output of the peak detector circuit into suitable form for driving an LED display 16, such that said display is indicative of the vertical oscillation frequencies of the shock absorber with which it is associated. Although those skilled in the art will be familiar with a wide variety of LED displays suitable for this application, the preferred embodiment comprises a linear array for readily comparing the movements of the various vehicle tires. Furthermore, the vehicle may use the variable resistor controls to readjust the display response and decay associated with each shock absorber after an inspection has indicated that all tires as adequately inflated and the shock absorbers are traveling within the particular drivers allowed tolerances.

Figure 8:
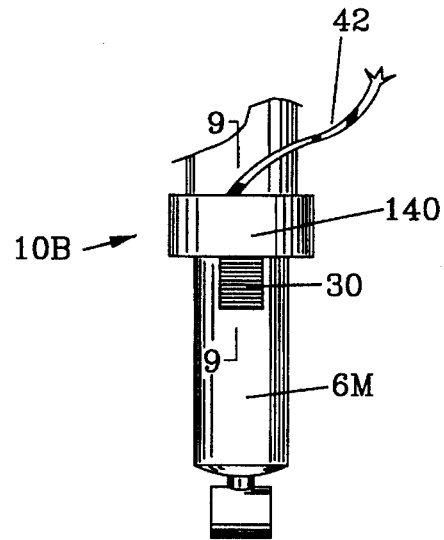
FIG. 8 is a front plan view of another embodiment of the tire and shock absorber monitor of the present invention.
Figure 9:
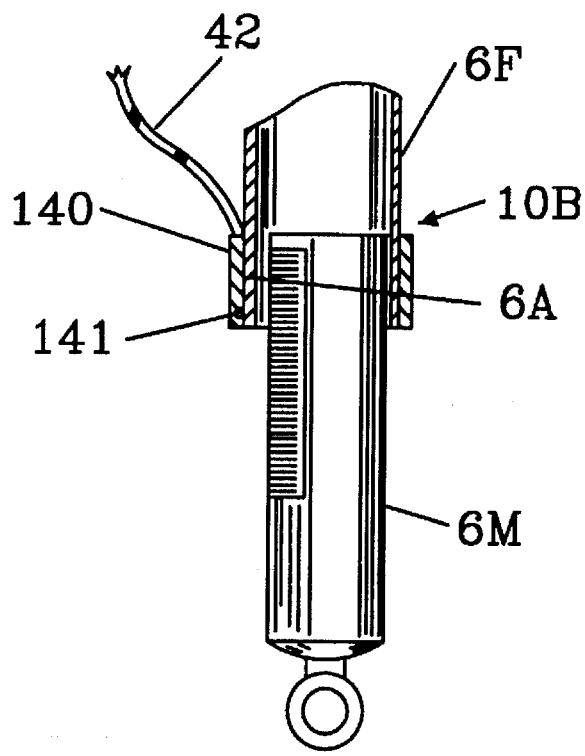
FIG. 9 is a section view of the embodiment of FIG. 8 along 9—9.
Figure 10:
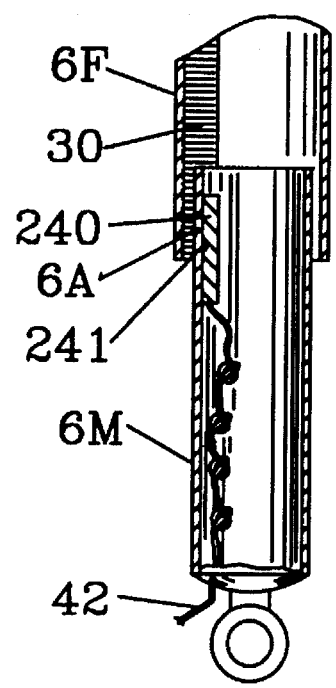
FIG. 10 is a section view, similar to that of FIG. 9, of another embodiment of the tire and shock absorber monitor of the present invention.

FIGS. 8 through 13 illustrate various other embodiments of the tire and shock absorber monitor 10 of the present invention, which, similar to that of monitor 10A, utilize photo-cell circuitry to identify the oscillation frequency of each shock absorber. Each of these may be readily utilized with either the electrical system 101 or 102, as well as with other embodiments of the electrical system of the present invention. FIG. 8 is a front plan view of a shock absorber monitor 10B, while FIG. 9 is a section view of the embodiment of FIG. 8 along 9—9. Similar to the monitor 10A, the monitor 10B includes a sensor mount 140 affixed about the exterior circumference of the fixed portion 6F of the vehicle shock absorber for securing a photo-cell 141 in suitable position for viewing the light reflected off a portion of the surface of the linear array 30 of substantially uniform alternating light and dark indicia, which is affixed to the movable portion 6F in a parallel plane with the shock absorber. Unlike the monitor 10A, however, the monitor 10B includes a fixed portion aperture 6A1 in the shock absorber for allowing the photo-cell circuit 141 to view said linear through the exterior surface of the fixed portion of the shock absorber.

FIG. 9 illustrates another method of securing photo-cell circuitry to the fixed portion 6F of a shock absorber. In this embodiment, the linear array of uniform alternating light and dark indicia is affixed to the interior surface of the fixed portion 6F via suitable affixing means such as a high adhesion glue, rather than to the exterior surface of the movable portion 6M, and connected electrically to the alarm unit 15 via conductor 42, which passes through an aperture 6A3 in the fixed end of the movable portion 6M. A photocell circuit 241 is affixed to the interior surface of the external wall of the movable portion, for viewing the linear array 30 through an aperture 6A2 in the wall of the movable portion 6M. Although this embodiment cannot be readily made into an after market version of the invention as readily as the embodiments of FIGS. 4 and 8, its primary advantage is in its ability to avoid environmental "noise" such as mud, etc.

Figure 11:
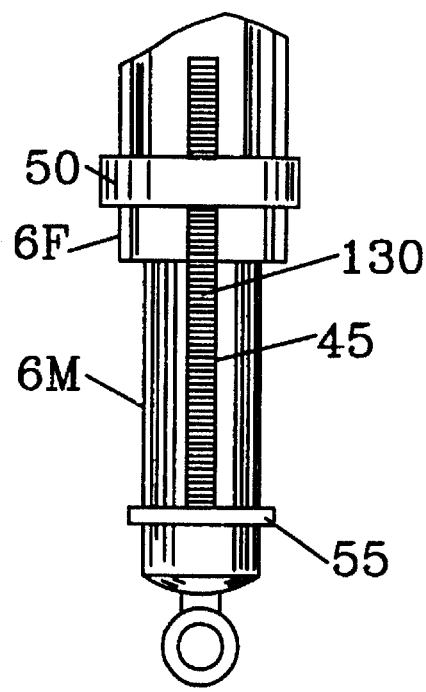
FIG. 11 is a front plan view of still another embodiment of the remote tire and shock absorber of the present invention.
Figure 12:
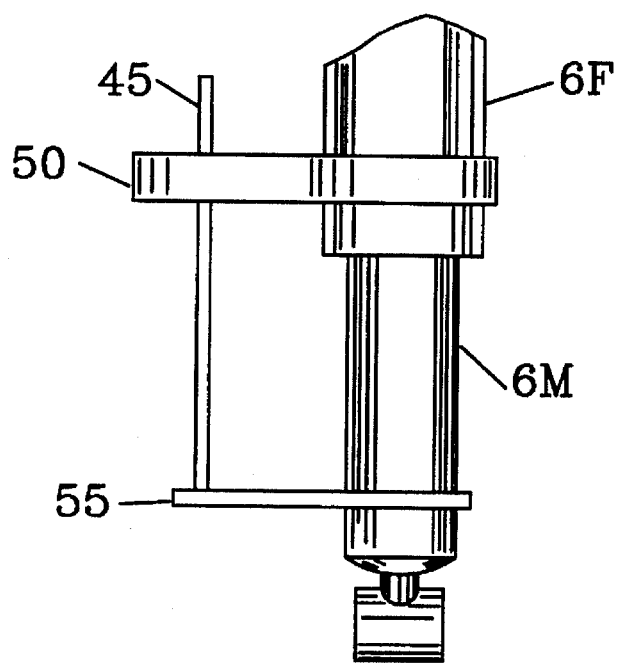
FIG. 12 is a side plan view of the embodiment of FIG. 11.
Figure 13:
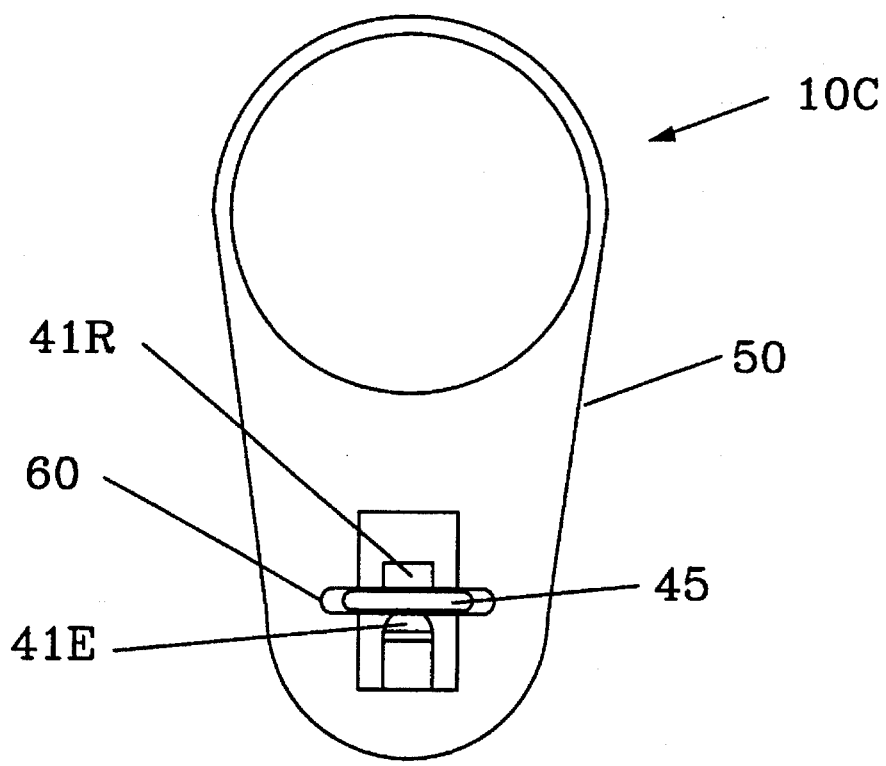
FIG. 13 is a section view of the embodiment of FIG. 12 along 13—13.

FIGS. 11, 12 and 13 illustrate another embodiment of the tire and shock absorber monitor of the present invention which utilizes photo-cell circuitry for monitoring a fixed array of uniform light and dark alternating indicia 130. In this embodiment is provided a monitor 10C having a monitor base 50 mounted to the fixed portion 6F of the shock absorber. The monitor base 50 further comprises an aperture 60 therethrough, said aperture 60 having an axis which is substantially parallel to that of the shock absorber. Further included in the monitor base 50 is a photo-emitter 41E for transmitting light in a direction substantially perpendicular to the axis of said shock absorber, and a photo-sensor 41P for sensing said light. Said photo-emitter 41E and photo-sensor 41P are substantially coplanar and mounted adjacent opposite edges of said monitor base aperture 60, such that said light is readily transmitted from the photo-emitter 41E across said aperture 60 to the photo-sensor 41P. A rod 45 is mounted to the movable portion of the shock absorber via a mounting bracket 55 which has bracket arms and clamping means similar to that of the monitor base 50, such that the axis of the rod 45 is substantially parallel to that of the shock absorber and a main length of said rod is positioned within said monitor base aperture 60. The rod 45 further travels synchronistically with said movable portion 6M of the shock absorber such that said main length of the rod 45 traverses the light transmitted from said photo-emitter 41E. Further included with the rod 45 is a linear array 130 of uniform apertures therethrough, said linear array 130 being coaxially aligned with the rod 45, and the axis of each of said apertures being coaxially aligned with the light transmitted from the photo-emitter 41E for allowing said light to be transmitted to the photo-sensor 41P through said apertures such that the photo-sensor 41P receives from the photo-emitter 41E a pattern of light pulses having a pulse frequency corresponding to the oscillation frequency of the shock absorber. Those skilled in the art will recognize that a wide variety of uniform indicia, such as alternating patterns of color, magnetic striping, etc., can be utilized in conjunction with the rod 45 for creating light pulses having a frequency proportional to the oscillation frequency of the shock absorber.

Figure 14B:
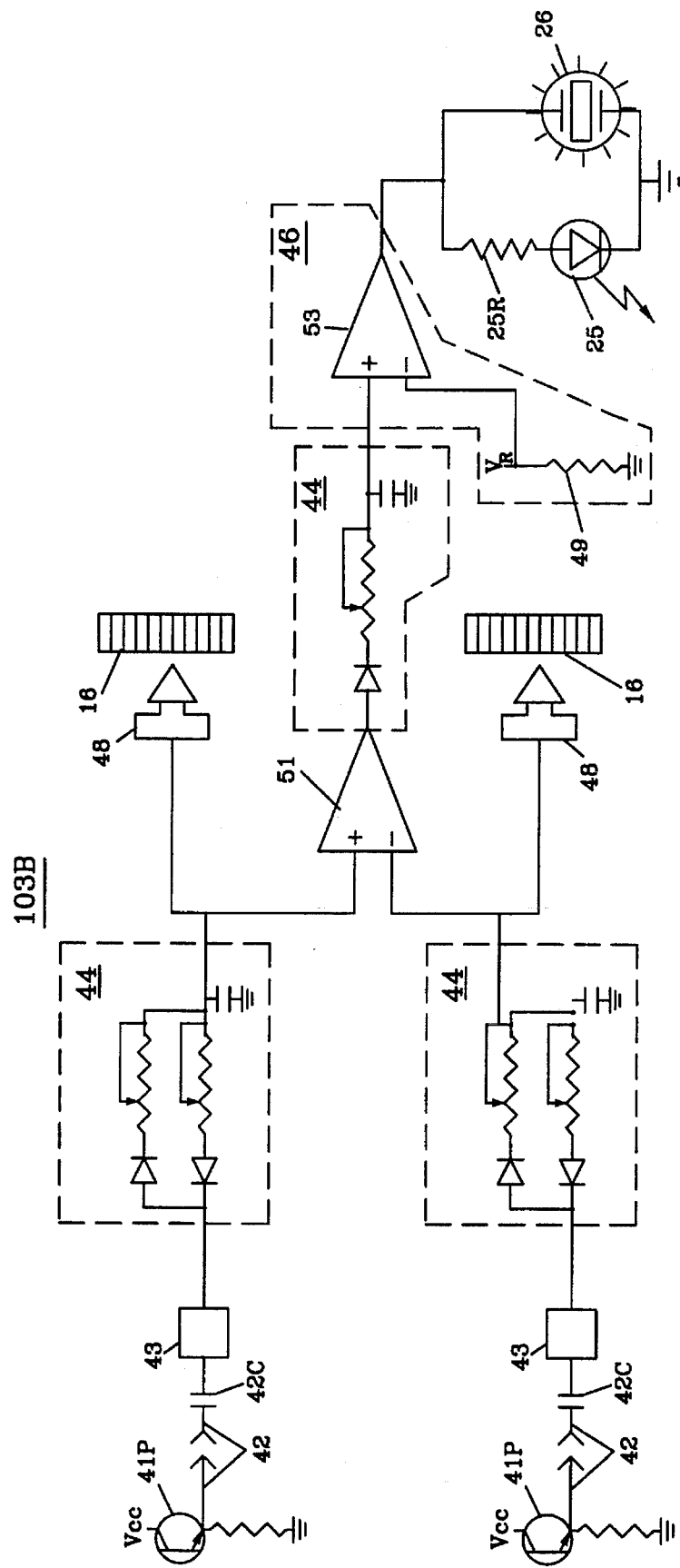
FIG. 14B is a block diagram and partial electronic schematic of still another embodiment of the circuitry associated with the tire and shock absorber monitoring system of the present invention.

FIGS. 14A and 14B show alternate embodiments of electronic circuitry of the present invention that can be used in conjunction with the photo-cell based monitors discussed above. Both of the systems illustrated in FIGS. 14A and 14B include means for automatically comparing the oscillation frequencies of at two shock absorbers and actuating suitable alarm indicators should the variance between said oscillation frequencies exceed a predetermined threshold. As well, the embodiment of FIG. 14B includes means for allowing the vehicle driver to visually compare the oscillation frequencies of all monitored shock absorbers. In the embodiment of FIG. 14A is provided a system 103A having a suitable comparator 53, such as an LM339, into which is received the electric outputs from the peak detector circuits 44 and photo-cell circuitry associated with two shock absorbers of the vehicle. Should the variance between the shock absorbers exceed the threshold allowed by the comparator 53, said comparator 53 closes its internal switch for actuating the visual and audible alarm indicators 25 and 26, respectively. As previously discussed, an even "simpler" circuit may be created by deleting the peak detectors circuits 44 from this embodiment of the present invention, however, it a significant reduction in system reliability and ease of operation results. Likewise, although the system 103A is a very simple circuit, it may take some time "zero base" adjusting the variable resistors 21 at system initialization or when the tires and shock absorbers have been placed back into a desired state to overcome the difficulties inherent in controlling such simple circuitry.

FIG. 14B illustrates a preferred embodiment of the photo-cell associated circuitry of the present invention, which overcomes such control difficulties. In this embodiment is provided a system 103B which likewise includes a comparator 53 for analyzing the electric outputs of the photo-cell and peak detector circuits associated with two tins of a vehicle and actuating the associated alarm indicators 25 and 26 when the determined variance in oscillation frequencies exceeds a preselected value. However, this system further includes a differential amplifier 51 with associated peak detection circuit 44D electrically connected between the comparator 53 and the circuitry associated with each shock absorber, for normalizing into one frequency the variance between the oscillation frequencies of each shock absorber. Further included in the system 103B is a variable resistor 49 for initializing and adjusting the variance at which the comparator 53 compares the electric signal received from the differential amplifier 51 circuit, making it significantly easier to initialize and or reset the monitoring system. Further included in the system 103B is a display driver integrated circuit 48 and an LED display 16 electrically connected to the peak detection circuit 44 associated with each shock absorber, This allows the driver to visually monitor and compare the oscillation frequencies of each shock absorber.

FIG. 15 is a front plan view of still another embodiment of the remote tire and shock absorber monitor of the present invention, in which is provided a monitor 10D. Said monitor 10D is similar in external appearance to that of the monitor 10C, having a monitor base 150 mounted to the fixed portion 6F of the shock absorber via suitable bracket arms 59 (not shown) and clamping means 58 (not shown), an aperture 160 therethrough, said aperture 160 having an axis which is substantially parallel to that of the shock absorber, and a rod 145 mounted to the movable portion of the shock absorber via a mounting bracket 155 which has bracket arms and clamping means similar to that of the monitor base 150. Said rod 145 is mounted to the movable portion 6M such that the axis of the rod 145 is substantially parallel to that of the shock absorber and a main length of said rod is positioned within said monitor base aperture 160. The rod 145 further travels synchronistically with said movable portion 6M of the shock absorber such that said main length of the rod 145 traverses the aperture 160. However, instead of including a photo-circuit for monitoring the portion of the rod 145 traversing said aperture 160, monitor 10D utilizes a magnetic velocity transducer for monitoring the oscillation frequency of the shock absorber. The monitor 10D includes a coil L2 wrapped within the monitor base 150 around the aperture 160. In turn, the rod 145 is made of magnetized ferrous metal for inducing a voltage in the coil L2. The voltage induced in the coil L2 is proportional to the rate of change of magnetic flux linked by the loop, which is thereby proportional to the oscillation frequency of the movable portion of the shock absorber. The coil L2 is electrically connected to a suitable oscillator 63, which is further connected to an F/V converter 43. The magnetic inductance of the ferrous rod 145 within the coil L2 changes the oscillation frequency of the oscillator 43 in proportion to the displacement and oscillation frequency of the rod 145 within the coil L2, thereby generating an electric signal indicative of the vertical oscillation frequency of the shock absorber. This signal is further carried across the peak detector circuit 44 and display driver circuit 48 for driving the LED display 16.

Figure 22:
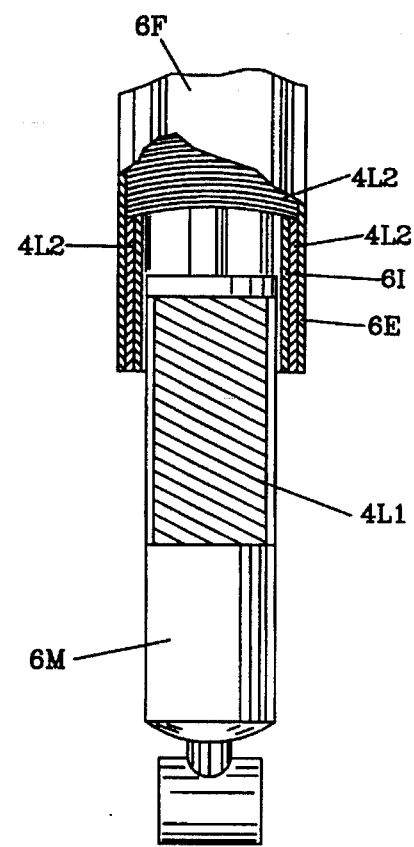
FIG. 22 is a front plan view with partial section view of another embodiment of the remote tire and shock absorber monitor of the present invention Upon reference to FIG. 1 and the various remaining figures, it will be noted that the tire and shock absorber monitoring system of the present invention includes a one or more remote sensors for monitoring a vehicle tire and shock absorber and generating an electric signal indicative the movements being measured, and an alarm indicator unit for transforming said electric signals into an alarm or a visual display for visually comparing the monitored movements of each tire to other tires of the vehicle. The remaining figures illustrate various embodiments of remote sensors and electrical circuitry associated with the tire and shock absorber monitoring systems using each remote sensor embodiment. (All like numerical designations in the various figures of the appended drawings represent the same element.) Variations exist between the different illustrated embodiments, which are specifically pointed out herein, and which fall within the scope of the invention.

An alternate version of the monitor of the present invention which further utilizes the use of a magnetic velocity transducer 80 is illustrated in FIG. 22, in which is provided a monitor 10G. Further provided in the monitor 10G is a coil 4L1 wrapped about the circumference and within the exterior surface 6ME of the movable portion 6M of the shock absorber. The coil 4L1 is affixed in a substantially parallel relationship to the movable portion 6M of the shock absorber and travels synchronistically with said movable portion 6M, thereby having a vertical oscillation frequency substantially equivalent to that of said movable portion. A second coil 4L2 is wrapped about the circumference and sandwiched between an exterior surface 6E of the fixed portion 6F and an interior surface 6I of the fixed portion of the shock absorber in a substantially parallel relationship to the fixed portion 6F. The coil 4L2 is electrically connected to a suitable oscillator 63 (FIG. 17), which is further connected to an F/V converter 43. The coil 4L1 is not electrically connected, but is preferably made of a ferrus metal. Voltage is induced in the coil 4L2 which is proportional to the rate of change of magnetic flux linked by the loop 4L1, which is thereby proportional to the oscillation frequency of the movable portion of the shock absorber. The magnetic inductance of the coil 4L1 within the coil 4L2 changes the oscillation frequency of the oscillator 43 in proportion to the displacement and oscillation frequency of the coil 4L1 within the coil 4L2, thereby generating an electric signal indicative of the vertical oscillation frequency of the shock absorber.

Figure 18:
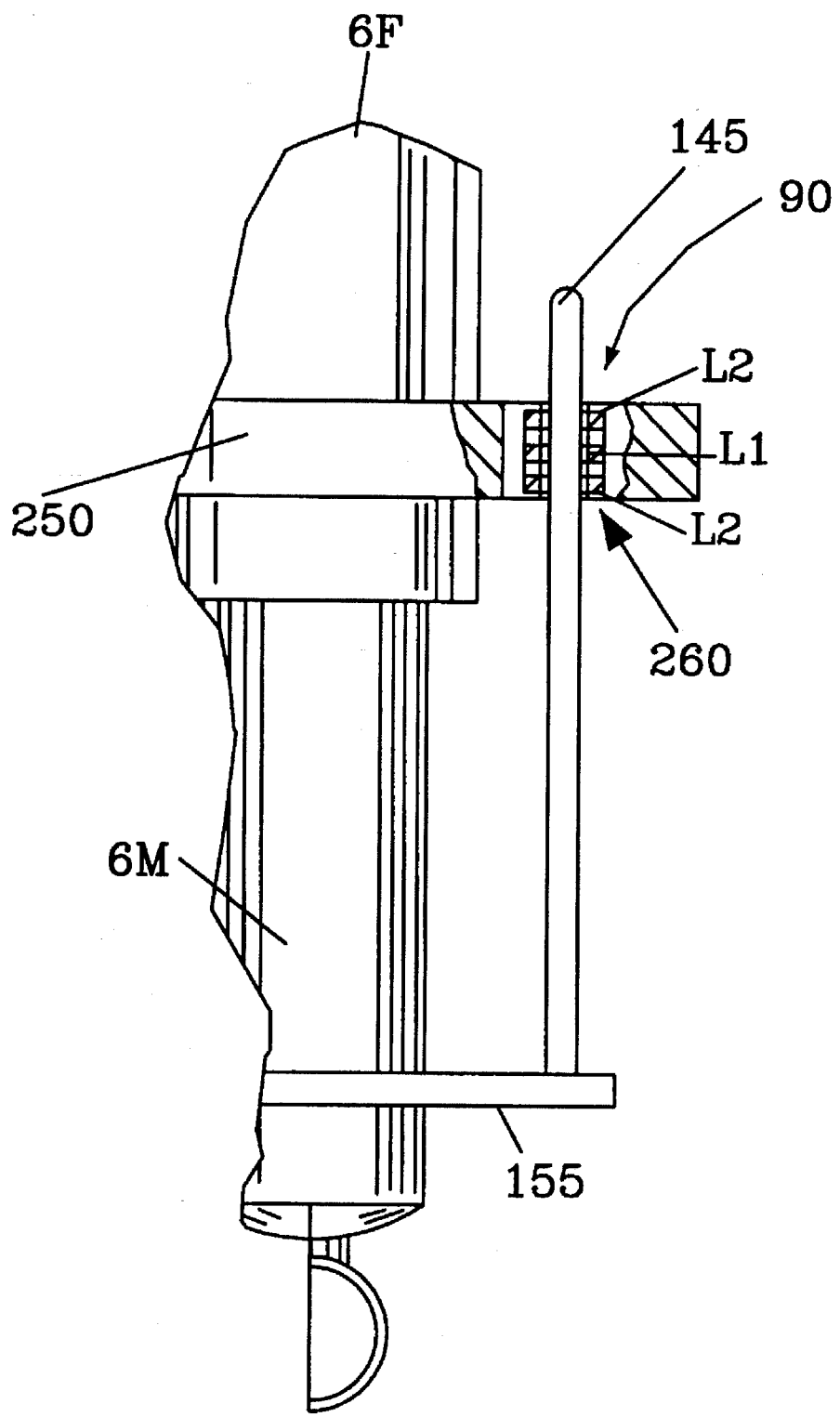
FIG. 18 is a side plan view with partial section view of another embodiment of the remote tire and shock absorber monitor of the present invention, similar in perspective to that of FIG. 16.
Figure 19:
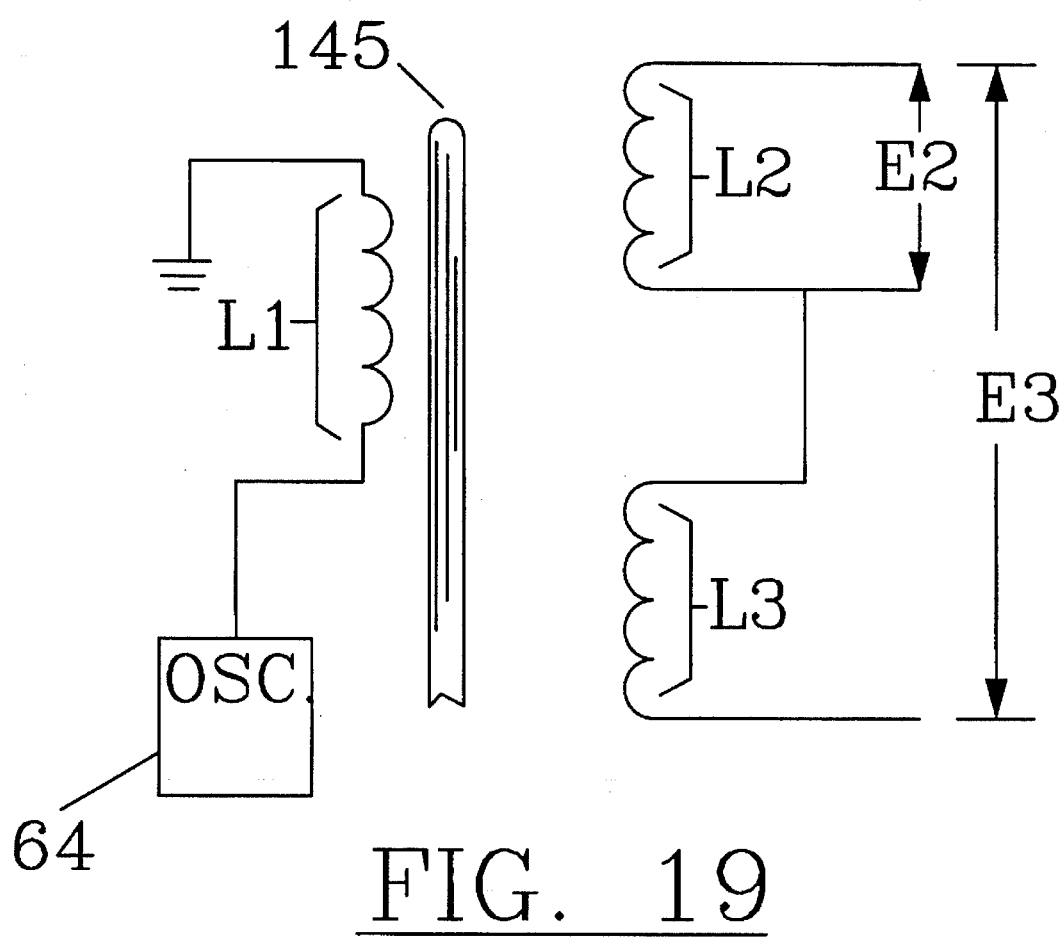
FIG. 19 is a block diagram of the electronic components illustrated in the section view portion of FIG. 18.
Figure 20:
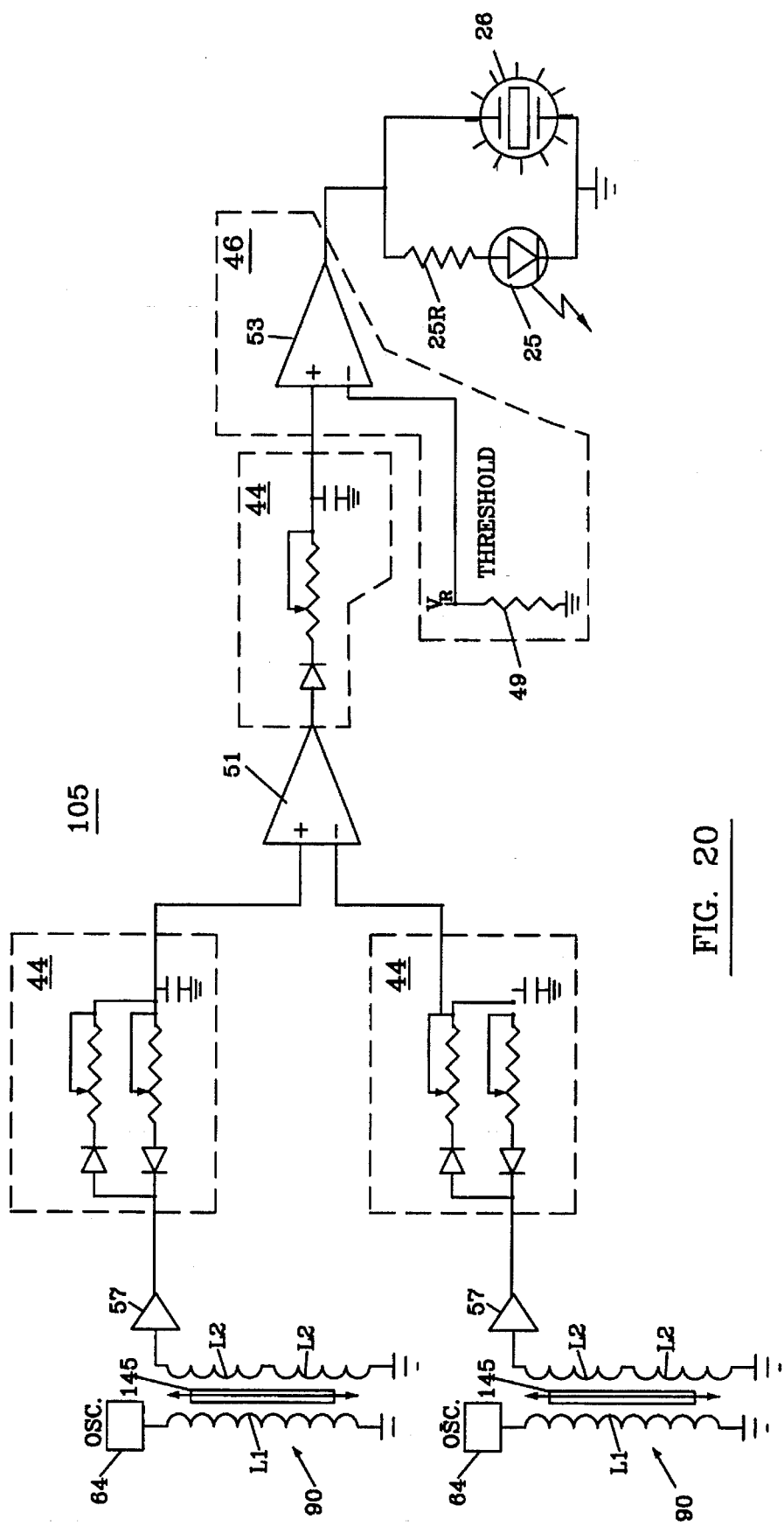
FIG. 20 is a block diagram and partial electronic schematic of another embodiment of the circuitry associated with the tire and shock absorber monitoring system of the present invention.

FIGS. 18, 19 and 20 illustrate yet another embodiment of the tire and shock absorber monitor of the present invention. FIG. 18 is a side plan view with partial section view of a monitor 10E which is very similar to that of monitor 10D, with the exception being its use of three metal coils, wrapped around the circumference of a monitor base aperture 260 such that they are in non-overlapping alignment, said aperture 260 being substantially similar to the aperture 160 of monitor 10D. The two exterior coils L2 are electrically connected to each other and to an Op Amp 57. The third coil LI is the primary coil in this version of a linear variable differential transformer 90, and is electrically connected to an oscillator 64 for inducing a frequency across the coils L2. The strength of the induced signal is in proportion to the displacement of the ferrous rod 145 within the aperture 260, and is amplified for input into the system 105 via the Op Amp 57 and an associated peak detector circuit 44. Said system 105 includes a comparator 53 for analyzing the electric outputs of the Op amp and peak detector circuits associated with two tires of the vehicle and actuating the associated alarm indicators 25 and 26 when the determined variance in oscillation frequencies exceeds a preselected value. However, this system further includes a differential amplifier 51 with associated peak detection circuit 44D electrically connected between the comparator 53 and file circuitry associated with each shock absorber, for normalizing into one frequency the variance between the oscillation frequencies of each shock absorber. Further included in the system 105 is a variable resistor 49 for initializing and adjusting the variance at which the comparator 53 compares the electric signal received from the differential amplifier 51 circuit.

Figure 21:
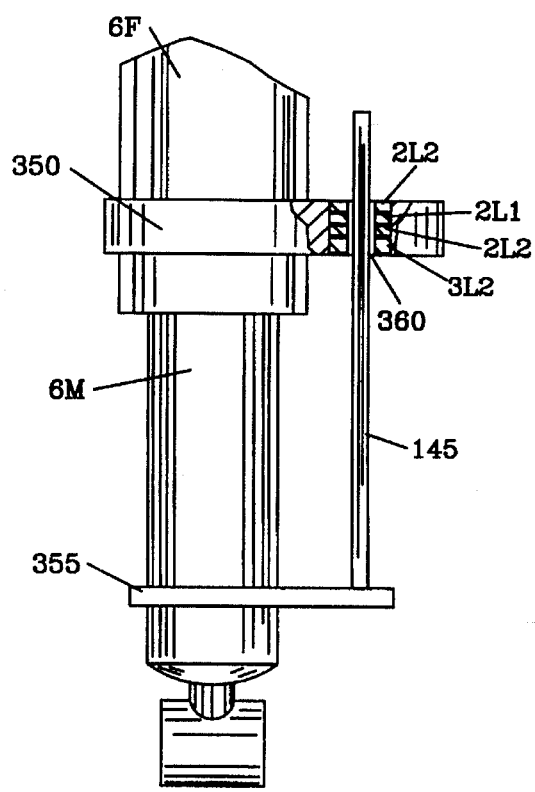
FIG. 21 is a side plan view with partial section view of another embodiment of the remote tire and shock absorber monitor of the present invention, similar in perspective to that of FIGS. 16 and 18.

FIG. 21 illustrates another embodiment of the tire and shock absorber monitor of the present invention, in which is provided a monitor 10F. Said monitor 10F combines the use of a magnetic velocity transducer 80 and a linear variable differential transformer 90 into a monitor appearing substantially similar to that of monitors 10D and 10E. Included in the monitor 10F is a monitor base aperture 360 substantially similar to the aperture 260 of monitor 10E, and the ferrous rod 145 is substantially similar to that of monitors 10D and 10E. Affixed within a monitor base 350, which is substantially similar to the monitor base 250 of monitor 10D, and about the circumference of the aperture 360 are four coaxially aligned coils 2L2, 2L1, 2L2, and 3L2. The coils 2L2, 2L1, and 2L2 are substantially similar to those of the linear variable differential transformer of monitor 10D, and are electrically connected in substantially the same circuit of system 105, for monitoring the vertical displacement of two shock absorbers of the vehicle and actuating appropriate alarm indicators when the variance in said vertical displacement exceeds that of a predetermined value. The coil 3L2 is substantially similar to the coil L2 of the magnetic velocity transducer 80 of monitor 10D, and is electrically connected in substantially the same circuit as system 104, for allowing the vehicle driver to visually monitor the oscillation frequency of each of the fires to which said monitor 10F is monitoring.

It is apparent from the foregoing that there is provided within the scope of the present invention a new and improved remote tire and shock absorber monitor and system for warning a vehicle driver of a condition in which a vehicle tire is improperly inflated, or in which a vehicle shock absorber needs adjusting or replacing. The unique aspects of the present invention include utilizing use of means for monitoring the vertical displacement of a movable portion of a shock absorber or means for monitoring the vertical oscillation frequencies of said movable portion, and means for warning the vehicle driver when either the vertical displacement or the vertical oscillation frequency deviates from a predetermined threshold variance. Said means include circuitry and components which are simple, economical and durable.

The inventor has given a non-limiting description of several embodiments of the invention, to which many changes may be made without deviating from the spirit of the invention. While this invention has been described with reference to various illustrative embodiments, this description is not intended to be construed in a limiting sense. Various modifications and combinations of the various embodiments as well as other embodiments of this invention will be apparent to a person skilled in the art upon reference to this description. Other changes such as those which are aesthetic, or those which include the substitution of other materials as they become available, which substantially perform the same function in substantially the same manner with substantially the same result without deviating from the spirit of this invention may be made. It is therefore contemplated that the appended claims cover any such modifications and/or embodiments that fall within the true scope of this invention.

We claim:

1. A remote shock absorber monitor for monitoring a vertical oscillation frequency and for warning a vehicle driver that a vehicle shock absorber needs service, comprising, a monitor for monitoring the vertical oscillation frequency of a movable portion of a shock absorber of the vehicle, wherein the monitor includes a plurality of indicia affixed to the movable portion of the shock absorber in a linear array coaxial with the movable portion, and a sensor mounted to a fixed portion of the shock absorber for monitoring the vertical movement of the indicia relative to the fixed portion of the shock absorber.

2. The apparatus as recited in claim 1, wherein the linear array of indicia includes a pattern of alternating dark and light colored shapes for reflecting from the fixed portion of the linear array, relative to the fixed portion of the shock absorber, a pattern of light pulses having a pulse frequency corresponding to the vertical oscillation frequency of the movable portion.

3. The apparatus as recited in claim 2, wherein the sensor includes a photo-cell circuit and a frequency to voltage convertor circuit.

4. A remote shock absorber monitor for warning a vehicle driver that a vehicle shock absorber needs service, comprising:

a monitor base mounted to a fixed portion of the shock absorber and having an aperture therethrough, the aperture having an axis which is parallel to that of the shock absorber;

a photo-emitter for transmitting light in a direction perpendicular to the axis of the shock absorber;

a photo-sensor for sensing the light, the photo-emitter and photo-sensor being coplanar and mounted adjacent opposite edges of the monitor base aperture, such that the light is transmitted from the photo-emitter across the aperture to the photo-sensor;

a rod mounted to the shock absorber such that the axis of the rod is parallel to that of the shock absorber, the rod having at least one end affixed to the movable portion of the shock absorber for moving a main length of the rod through the monitor base aperture synchronistically with the movable portion of the shock absorber such that the main length traverses the light transmitted from the photo-emitter, the rod further including a linear array of uniform apertures therethrough, the linear array being coaxially aligned with the rod, and the axis of each of the apertures being coaxially aligned with the light transmitted from the photo-emitter for allowing the light to be transmitted to the photo-sensor through the apertures such that the photo-sensor receives from the photo-emitter a pattern of light pulses having a pulse frequency corresponding to the oscillation frequency of the shock absorber; and a frequency to voltage convertor circuit electrically connected to the photo-sensor.

5. A remote shock absorber monitor for warning a vehicle driver that a vehicle shock absorber needs service, comprising, a monitor for monitoring vertical displacement of a movable portion of a vehicle shock absorber, wherein the monitor is a linear variable differential transformer affixed to the shock absorber such that a rod in the transformer is affixed in a parallel relationship to a movable portion of the shock absorber and moves synchronistically with the movable portion, having a vertical displacement equivalent to that of the movable portion, thereby generating an electric signal indicative of the vertical displacement of the shock absorber; and a warning device, attached to the monitor, for warning the driver of the vehicle when the vertical displacement of one of the shock absorbers varies significantly from the vertical displacement of another shock absorber.

* * * * *